Figure 1:
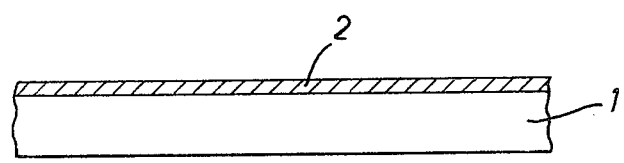

United States Patent [19]

Lansbury et al.

[11] 4,302,504
[45] Nov. 24, 1981

[54] FILM-FORMING COMPOSITION

[75] Inventors: Robert C. Lansbury, St. Albans; Thomas G. Heggs, Welwyn, both of England

[73] Assignee: Imperial Chemical Industries Limited, London, England

[21] Appl. No.: 689,544

[22] Filed: May 24, 1976

[30] Foreign Application Priority Data

Jun. 11, 1975 [GB] United Kingdom .............. 25010/75

[51] Int. Cl.$^3$ ........................ B32B 27/08; B32B 27/32
[52] U.S. Cl. ..................................... 428/332; 428/349; 428/515; 428/516; 428/523; 428/910; 525/240
[58] Field of Search ................... 260/897 A; 428/332, 428/515, 516, 517, 910, 523, 349; 525/240

[56] References Cited

U.S. PATENT DOCUMENTS

| | | | |
|---|---|---|---|
| 3,179,719 | 4/1965 | Cines | 260/897 A |
| 3,361,607 | 1/1968 | Bruno | 428/517 X |
| 3,496,061 | 2/1970 | Freshour et al. | 428/516 X |
| 3,733,378 | 5/1973 | McConnell et al. | 260/897 A |
| 3,832,270 | 8/1971 | Schirmer | 428/517 X |
| 3,894,120 | 7/1975 | Frese et al. | 260/897 A |
| 3,900,534 | 8/1975 | Schard | 260/897 A |
| 4,046,945 | 9/1977 | Baxmann et al. | 428/516X |
| 4,168,361 | 9/1979 | Oda et al. | 526/124 X |
| 4,211,852 | 7/1980 | Matsuda et al. | 428/523 X |

FOREIGN PATENT DOCUMENTS 2241570 6/1973 France .
1224035 3/1971 United Kingdom .......... 260/897 A Primary Examiner—Marion McCamish
Assistant Examiner—Alexander S. Thomas
Attorney, Agent, or Firm—Cushman, Darby & Cushman

[57] ABSTRACT

A film-forming composition comprising a copolymer of propylene with an alpha-olefin containing from 4 to 10 carbon atoms, the copolymer containing from 80 to 95% by weight of propylene, and from 25 to 90% by weight of the composition of a second homo- or copolymer of a similarly defined alpha-olefin. The composition is particularly suitable for the production of heat-sealable, multiple-layer films having a polypropylene core.

5 Claims, 2 Drawing Figures

FILM-FORMING COMPOSITION

This invention relates to a thermoplastic, film-forming composition, to a self-supporting film formed from the composition, and in particular to a multiple-layer film at least one layer of which is formed from said composition.

Accordingly, the invention provides a thermoplastic, film-forming composition comprising a blend of
- (a) a copolymer of propylene with an alpha-olefin containing from 4 to 10 carbon atoms in its molecule, the propylene content of the copolymer being from 80 to 95% by weight of the copolymer, and
- (b) a second polymer of an alpha-olefin containing from 4 to 10 carbon atoms in its molecule copolymerised with from 0 to 10% by weight of the copolymer of an alpha-olefin containing from 2 to 10 carbon atoms in its molecule, the second polymer constituting from 25 to 90% by weight of the composition.

The invention also provides a self-supporting film formed from a thermoplastic composition comprising a blend of
- (a) a copolymer of propylene with an alpha-olefin containing from 4 to 10 carbon atoms in its molecule, the propylene content of the copolymer being from 80 to 95% by weight of the copolymer, and
- (b) a second polymer of an alpha-olefin containing from 4 to 10 carbon atoms in its molecule copolymerised with from 0 to 10% by weight of the copolymer of an alpha-olefin containing from 2 to 10 carbon atoms in its molecule, the second polymer constituting from 25 to 90% by weight of the composition.

By a "self-supporting" film is meant a film capable of independent existence in the absence of a supporting substrate.

The invention further provides a multiple-layer film comprising a substrate layer of a homo- or copolymer of an alpha-olefin the molecule of which contains from 2 to 6 carbon atoms, and, on at least one surface of the substrate, a layer formed from a composition comprising a blend of
- (a) a copolymer of propylene with an alpha-olefin containing from 4 to 10 carbon atoms in its molecule, the propylene content of the copolymer being from 80 to 95% by weight of the copolymer, and
- (b) a second polymer of an alpha-olefin containing from 4 to 10 carbon atoms in its molecule copolymerised with from 0 to 10% by weight of the copolymer of an alpha-olefin containing from 2 to 10 carbon atoms in its molecule, the second polymer constituting from 25 to 90% by weight of the composition.

The invention still further provides a method of producing a multiple-layer film comprising forming a substrate of the hereinbefore defined alpha-olefin polymer, and applying to at least one surface of the substrate a composition, as hereinbefore defined.

Suitable substrate materials are homo- and copolymers of alpha-olefins-such as ethylene, propylene, butene-1, 4-methylpentene-1, and hexene-1. High density polyethylene, i.e. polyethylene of density in excess of 0.949 g/cm$^3$ and preferably less than 0.99 g/cm$^3$, is a suitable substrate material, although for packaging applications a preferred substrate is a propylene homo- or block co-polymer, the latter containing, for example, up to 15% by weight of the copolymer of another copolymerisable alpha-olefin containing 2 or from 4 to 6 carbon atoms in its molecule. The content of the other alpha-olefin is suitably from 0.25 to 15%, preferably from 0.5 to 10%, by weight of the copolymer.

Suitable monomers for copolymerising with propylene to form the propylene copolymer component [component (a)] of our compositions include pentene-1, hexene-1, heptene-1, and decene-1, although butene-1 has proved to be a particularly suitable comonomer.

The $C_4$ to $C_{10}$ alpha-olefins from which the second polymer component of our compositions [component (b)] is suitably formed include pentene-1, hexene-1, heptene-1, and decene-1, although butene-1 is preferred. It will be appreciated that this second component may be a homo- or a co-polymer. For example, when the comonomer selected from the group of $C_2$ to $C_{10}$ alpha-olefins either is employed at zero percentage concentration, or is identical to that selected from the $C_4$ to $C_{10}$ group of alpha-olefins, the second component of the compositions will be a homo-polymer. When the second component is a copolymer, the content of the $C_2$ to $C_{10}$ alpha-olefin is suitably from 0.25 to 10%, preferably from 0.5 to 6% by weight of the copolymer.

The content of the alpha-olefin monomer in the propylene copolymer material of component (a) should not be less than 5% by weight of the weight of the copolymer, because below that content the softening temperature of the copolymer is so high as to produce a film with a very high threshold sealing temperature, i.e. the lowest heat-sealing temperature at which seals of acceptable strength are obtained. Likewise, to prevent undue disruption of the crystalline structure of the propylene copolymer, the content of the other alpha-olefin monomer should be maintained at a level not exceeding 20% by weight of the copolymer. In the case of a propylene/butene-1 copolymer, a butene-1 content of from about 10 to 20% by weight of the copolymer has proved especially suitable, and for application to a polypropylene substrate, we particularly prefer to employ a copolymer in which the content of butene-1 is from 10 to 15%, preferably from 11.5 to 13.5%, by weight of the copolymer.

To ensure the production of heat-sealable films which exhibit acceptable heat-seal strengths, the content of the second alpha-olefin polymer [component (b)] should be within a range of from 25 to 90% by weight of the composition, preferably within a range of from 30 to 80% by weight of the composition. However, to ensure the production of films exhibiting acceptable optical characteristics, such as wide angle haze and gloss, and particularly when the second polymer component is a butene-1 homo- or co-polymer, we prefer that the content of the second polymer should be within a range of from 35 to 65% by weight of the composition. Desirable heat-sealing characteristics are achieved when the butene-1 homo- or co-polymer content is from 40 to 50% by weight of the composition.

Suitably, the propylene copolymer, component (a), in granular form prior to incorporation into the film-forming composition, has a Melt Flow Index, measured in accordance with ASTM/D1238-65T (condition N), of between 10 and 400 g/10 minutes, preferably between 10 and 200 g/10 minutes, and particularly preferably between 60 and 80 g/10 minutes. Suitable copolymers, therefore, have a molecular weight (weight average) of from about 350,000 to about 120,000, and preferably from about 350,000 to about 140,000.

Suitably, the second polymer, component (b), in granular form prior to incorporation into the film-forming composition, has a Melt Flow Index, measured by the hereinbefore specified technique, of less than 50 g/10 minutes, and preferably, to ensure acceptable heat-sealing characteristics in films formed from the composition, between 5 and 40 g/10 minutes, particularly preferably between 10 and 25 g/10 minutes.

Although the propylene copolymers employed in the film-forming compositions may be described as random copolymers, we believe that the copolymerisation may not be random in an exact statistical sense. Thus, although in the production of our copolymers the respective comonomers are usually fed simultaneously to a polymerisation reactor for at least a substantial part of the reaction time, it is probably easier for either the propylene or other alpha-olefin monomer units to link up to the growing polymer chain immediately adjacent to an identical monomer unit, so that there may be a tendency for short sequences of identical monomer units to form preferentially in the polymer chain.

Formation of our copolymers is conveniently effected in the presence of a "stereospecific" catalyst by which is meant a catalyst which will under equivalent conditions polymerise propylene in the absence of other monomers, to polypropylene which is at least 70% insoluble in boiling heptane. Catalysts capable of doing this comprise a transition metal compound and an organometallic activator; they are well known in the art—see for example, "Linear and Stereoregular Addition Polymers" by Gaylord and Mark, published by Interscience in 1959. Particularly useful compounds of this type are trivalent titanium compounds activated with aluminium alkyl compounds. We prefer to use titanium trichloride obtained by reduction of titanium tetrachloride either with an aluminium alkyl compound or with aluminium metal, with an aluminium alkyl halide as activator. A particularly useful and highly stereospecific catalyst is obtained by reducing titanium tetrachloride in an inert hydrocarbon diluent at a temperature of from $-20°$ C. to $+20°$ C. with an aluminium alkyl sesquichloride, preferably by adding the sesquichloride gradually to the titanium tetrachloride dissolved in the hydrocarbon, the titanium trichloride material so obtained being recovered, optionally washed or heated one or more times between $40°-150°$ C., or both, and used as a catalyst in the presence of an aluminium dialkyl chloride, such as diethylaluminium chloride, as activator.

Catalyst components may be introduced into the polymerisation zone as solutions or suspensions in hydrocarbon diluent. Polymerisation is normally carried out at temperatures of from $20°$ to $75°$ C. and may be effected in the presence of a diluent such as an inert hydrocarbon, propylene itself, or a mixture of propylene with an inert hydrocarbon.

A range of polymerisation pressures may be used, but it is necessary to control the ratio of the partial pressures of propylene and other alpha-olefin in the reaction vessel so as to produce copolymer of the required composition. Polymerisation is carried out in the absence of substantial quantities of air and water as these materials inhibit the catalysts used, but a chain transfer agent, such as hydrogen, may be present to control the molecular weight of the copolymer. When polymerisation is complete, the reaction may be stopped, for example, by adding an alcohol, such as isopropanol, and the catalyst residues removed by washing with a suitable reagent, e.g. water or more isopropanol, or mixtures of acetylacetone and lower alcohols.

The production of these copolymers may be effected by a technique similar to that disclosed in our British Pat. No. 1 084 953 for the production of propylene copolymers rich in butene-1.

Propylene copolymers for use in the film-forming compositions of the present invention are substantially crystalline, and suitably exhibit a degree of crystallinity, as hereinafter defined, of from 35 to 65%. In the case of propylene/butene-1 copolymers we prefer that the degree of crystallinity should be within a range of from 40 to 60%, and particularly preferably within a range of from 45 to 55%.

The degree of copolymer crystallinity referred to herein is determined by a technique basically similar to that described by Natta, Corradini, and Cesari, Rend. Accad Naz. Lincei 1957, 22, 11. Thus, an X-ray diffraction scan of a copolymer sample, thermally cycled as hereinafter described, is obtained using a Philips PW 1010 diffractometer, working in transmission, with Cu-K$\alpha$ radiation and pulse height discrimination. A straight background base line is drawn in on the resultant "crystalline" diffraction spectrum between $\theta$ of $4°$ and $16°$, where $\theta$ is the Bragg angle, and the diffraction spectrum of a 100% amorphous polypropylene sample is congruently superimposed on the "crystalline" spectrum in this region of $\theta$ so that the amorphous spectrum grazes the minimum of the "crystalline" spectrum occurring at $\theta$ of approximately $7.75°$, a minimum at this point being indicative of the absence of crystalline modifications other than the alpha or monoclinic crystalline modification of polypropylene. The total area between the "crystalline" spectrum and the amorphous spectrum in the specified range of $\theta$ is equated to the intensity of crystalline scattering (C), and the area between the amorphous spectrum and the base line is equated to the intensity of amorphous scattering (A). The percentage degree of crystallinity is then defined as $100C/(C+A)$, with no corrections.

The thermal history of the copolymer samples prior to determination of crystallinity is of importance, and to achieve consistent results within the aforementioned definition samples are prepared by pressing, at $210°$ C., thin plates from the copolymer powder as originally made, and cooling the plate at a moderate rate. A specimen (10 mg) is cut from the plate, and placed in a standard aluminium pan (6.35 mm diameter) the latter then being placed in a cavity in a brass block sealed by a thick brass lid, the sealed block together with the lid measuring approximately $15\times 100\times 120$ mm, and heated by immersion of the sealed block in an oil bath of approximately 5 liters capacity maintained at a temperature of $160°$ C.

Introduction of the brass block reduces the temperature of the bath, and slow heating of the bath is therefore continued until a temperature of $160°$ C. is recorded on a thermocouple positioned within the brass block. This final heating process occupies some 15 minutes, the desired temperature of $160°$ C. being reached asymptotically and the increase from $150°$ C. to $160°$ C. occupying a period of about 10 minutes. Cooling is then started immediately, and continued at a controlled rate of $6°$ C. per hour until the sample attains ambient temperature. The cooled sample is then finely chopped, and placed in a thin-walled PANTAK glass tube of 2 mm diameter for X-ray examination.

As hereinbefore described, the propylene copolymers employed in the compositions of the present invention when examined by the aforementioned technique, before the copolymers have been incorporated into the composition, exhibit a degree of crystallinity of from 35 to 65%. By way of comparison, a typical commercially available propylene homopolymer exhibits a degree of crystallinity, determined by the same technique, of the order of 70%.

Commercially available propylene homopolymer normally crystallises in the alpha or monoclinic form when slowly cooled, e.g. at a rate of about 6° C. per hour, from its melting temperature in the absence of added nucleating agents. Under certain extreme conditions, for example under the application of exceedingly high pressures, it has been observed that a proportion of the gamma or triclinic crystalline modification becomes associated with the normal alpha or monoclinic modification, but that an orienting the product, for example by cold drawing or by drawing from the melt, the gamma modification reverts to the alpha-form so that the crystalline content of the oriented polypropylene consists substantially entirely of the alpha or monoclinic crystalline modification. It is propylene homopolymers of this kind, having a crystalline content substantially entirely of the alpha or monoclinic modification, which are preferred for use in the substrate layer of the multiple-layer films of the present invention.

We have also observed that random copolymers of propylene with small proportions, e.g. up to about 20% by weight of the copolymer, of ethylene, butene-1, and higher mono-olefins, develop a relatively high proportion of the gamma crystalline form mixed with the alpha-form on slow cooling from a melt. For example, a series of propylene/butene-1 copolymers, in which the content of butene-1 by weight of the copolymer ranged from about 4 to 20%, exhibited a degree of crystallinity, as hereinbefore defined, of from about 60 to 40%, the crystalline content of the copolymers consisting essentially of a mixture of the alpha and gamma modifications, the latter constituting from about 20 to 50% of the total crystalline content. No trace of the beta or hexagonal crystal modification was observed.

X-ray diffraction examination of oriented multiplelayer films formed in accordance with the present invention, and containing one or more layers of a copolymer of the kind referred to in the immediately preceding paragraph, revealed no trace of the gamma crystalline modification, indicating that the latter had reverted to the alpha modification which constituted the entire crystalline content of the examined copolymer layers.

Formation of the compositions of the present invention is conveniently achieved by dry blending, for example in a tumbler blender, the appropriate quantities of the propylene copolymer component (a) and the second alpha-olefin polymer component (b). However, we prefer to employ a melt blending technique to ensure the production of a homogeneous blend so that films formed therefrom may exhibit improved optical characteristics.

Self-supporting films are suitably formed from the compositions of the present invention in any conventional manner—for example, by extrusion, pressing, or solvent- or melt-casting techniques. However, the compositions are particularly suitable for incorporation into multiple-layer films, the composition constituting at least one layer adhered to a substrate layer.

Application of the heat-sealable composition layer onto the substrate is conveniently effected by any of the laminating or coating techniques conventionally employed in the production of composite films. Thus preformed sheets of the substrate material and of the composition may be laminated together, preferably with the use of adhesives—for example, by passing the components of the laminate together between pressure rollers maintained at suitable temperatures. Alternatively, the composition may be applied to the substrate as a solution or dispersion in a suitable, preferably hot, liquid medium, such as toluene, o, m or p-xylene, monochlorobenzene, cyclohexane, or trichloroethylene, which may subsequently be recovered and recycled for further use. Preferably, however, the composition is applied to the substrate by means of a melt- or extrusion-coating technique in which either a molten layer of the composition is extruded directly onto the surface of a preformed substrate, or the polymeric components of the substrate and composition layer are coextruded under conditions such that the component layers come into contact with each other while each is still molten.

When the composition is applied to a preformed substrate, the adhesion of the applied layer to the substrate may be improved by orienting the substrate after application of the composition.

Adhesion of the heat-sealable composition layer to the substrate may also be improved, if desired, by the use of an intermediate anchor coating applied to the substrate prior to application of the composition layer. Suitable anchor coating materials include ethylene-vinyl acetate copolymers, or ethylene-alkyl (meth)-acrylate copolymers.

However, as hereinbefore described, we prefer to employ a coextrusion technique, and when two or more molten polymeric layers are coextruded and contacted with each other while still in the molten state, the need to employ intermediate anchor coatings is obviated. Suitably, the coextrusion is effected from a multichannel die so designed that the molten polymeric components constituting individual layers of the composite film merge at their boundaries within the die to form a single composite web which is then extruded from a common die orifice. It will therefore be understood that any reference in this specification to the composition layer being "applied to", "provided on", or otherwise deposited on the substrate layer includes the formation of a multiple-layer film structure by the simultaneous coextrusion of the substrate layer and a composition layer on one or each surface of the substrate layer.

Preferably, films made in accordance with this invention are stretched to orient them. Orientation may be effected uniaxially, by stretching the film in one direction, or biaxially, by stretching the film in each of two mutually perpendiculr directions in the plane of the film, and the biaxial orientation may be balanced or unbalanced, for example with the higher degree of orientation of an unbalanced film in a preferred direction—usually the longitudinal or machine direction. Conveniently, the polyolefin substrate material and the heat-sealable composition are coextruded in the form of a composite tube which is subsequently quenched, reheated, and the expanded by internal gas pressure to induce transverse orientation, and withdrawn at a rate greater than that at which it is extruded to stretch and orient it in the longitudinal direction. Alternatively, a flat composition-coated film may be oriented by simultaneous or sequential stretching in each of two mutually perpendicular directions by means of a stenter, or by a combination of draw rolls and a stenter. When a composite, heat-sealable film is formed by bonding together two preformed films, only the substrate film need be oriented prior to the bonding operation.

The degree to which the film is stretched depends to some extent on the ultimate use for which the film is intended, but for a polypropylene-based packaging film we find that satisfactory tensile and other properties are developed when the film is stretched to between three and ten, preferably, seven, times its original dimensions in each of the transverse and longitudinal directions.

After stretching, the polymeric film is normally "heat-set", while restrained against shrinkage, at a temperature above the glass transition temperature of the polymer and below its melting point. The optimum heat-setting temperature can readily be established by simple experimentation, and for a polypropylene substrate, "heat-setting" is conveniently effected at temperatures in the range of from 115° and 160° C. Heat-setting may be effected by conventional techniques—for example by means of a stenter system, or by a system of one or more heated rollers as disclosed, for example, in British Pat. No. 1,124,886.

Composite multiple-layer films in accordance with the present invention may be prepared in a range of thicknesses governed primarily by the ultimate application for which a particular film is to be employed. Films, having a total thickness in a range extending from 2.5 to 100 microns are of general utility, but for packaging applications we prefer to employ film of from about 10 to 50 microns in total thickness.

The ratio of substrate to composition layer thickness may vary within a wide range, although we prefer that the thickness of the composition layer should not be less than 0.2% (preferably 0.5%), nor greater than 50% of that of the substrate.

Hitherto, in multiple-layer films having an external layer comprising a propylene/butene-1 copolymer layer it has been observed that a desirably high hot seal strength is achieved only when the thickness of the propylene copolymer layer is maintained within a narrow range extending from about 0.25 to 0.45 micron. However, use of the compositions of the present invention comprising a blend of a propylene copolymer and a second alphaolefin polymer enables acceptably high hot seal strengths to be achieved when the thickness of the composition layer is within a much wider range extending from about 0.05 micron to greater than 0.6 micron. Close control of the surface layer thickness thereby becomes a much less significant problem.

A further advantage of replacing the propylene/butene-1 copolymer surface layer with a layer of a composition according to the present invention is that the thickness of the surface layer required to yield acceptable "cold" heat-seal strengths is reduced from at least about 0.2 micron to 0.1 micron, or less. Additionally, the threshold sealing temperature can be reduced by several degrees Centigrade.

If desired, a multiple-layer film may be formed by providing both surfaces of the substrate with a heat-sealable layer of a composition according to the present invention, and the thicknesses of the two composition layers may be the same or different. For example a substrate film of 25 microns thickness is conveniently provided with a composition layer of 0.75 micron thickness on one surface and with a composition layer of 0.25 micron thickness, or less, on the other surface. Alternatively, one surface of the substrate may be uncoated, or may be coated with a layer of a different composition depending on the properties required of the film for a particular application.

If desired, for example to improve print receptivity, the non-seal-forming surface of a multiple-layer film having a heat-sealable layer of a composition according to the present invention may be subjected to a chemical treatment, or to a physical treatment which oxidises the surface of the film. For example, the surface may be treated with chromic acid in sulphuric acid, with hot nitric acid, or with ozone. Alternatively, the film surface may be exposed to ionising radiation, or to a thermal flame for a sufficient time to effect superficial oxidation without distortion of the surface. A preferred treatment, because of its simplicity and effectiveness, is to subject the film surface to a high voltage electric stress accompanied by corona discharge, but we have observed that such treatment tends to adversely affect the attainable hot and cold seal strengths.

If desired, the "cold" heat-seal strength and/or the hot seal strength of multiple-layer films having a surface layer of a composition according to the present invention may be improved by incorporating into the substrate layer a portion of scrap polymeric material, both substrate and composition layer(s), reclaimed from a previously produced multiple-layer film. Conveniently, the reclaimed material constitutes from 25 to 50%, preferably from 30 to 45%, by weight of the substrate layer, but reclaim levels within an extensive range on either side of these values can be tolerated. Significantly improved seal strengths have, in fact, been observed when the substrate layer is formed entirely from reclaimed material.

The compositions of the present invention and one or more of the layers of the films formed therefrom may conveniently contain any of the additives conventionally employed in the manufacture of thermoplastic films. Thus, additives such as dyes, pigments, lubricants, anti-static agents, anti-oxidants, anti-blocking agents, surface-active agents, slip aids, stiffening aids, glossimprovers, prodegradants, and ultra-violet light stabilisers may be employed. Films are conveniently rendered antistatic by the incorporation therein of from 0.1 to 1.0% by weight of the film of one or more substances of formula

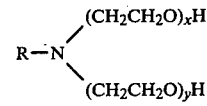

wherein x+y is from 2 to 5 and R is a monovalent aliphatic radical containing from 12 to 22 carbon atoms, and from 0.01 to 0.5% based on the weight of the film of a fatty acid amide derived from a fatty acid containing from 10 to 22 carbon atoms, as disclosed in our British Patent 1 034-337.

Composite films formed with a surface layer of a composition in accordance with the present invention are heat-sealable at comparatively low temperatures, for example at temperatures of the order of 120° C. and lower, to provide a strong, hermetic seal. In addition, the heat-sealable composition layer adheres securely to the substrate material, exhibits desirable scratch- and scuff-resistance, and is resistant to sticking to the jaws of the heat-sealing equipment.

The elimination of jaw-sticking is of considerable importance to the packaging industry where the intermittent sticking of a packaging film to the jaws of heat-sealing equipment employed to form individual packages by sealing the film to itself, can impede or halt the uniform passage of film through the equipment, thereby disrupting the packaging operation. The problem is of particular concern in relation to packaging machines of the so-called vertical "form and fill" type.

Films formed from the compositions of the present invention are suitable for use in the packaging industry, particularly for the formation of flexible packages for foodstuffs and the like. They may however, be employed in any other application for which a heat-sealable polyolefin film is required.

The hot seal strength rating of a film formed from a composition of the present invention is determined by means of a calibrated strip of spring steel of approximately 25 mm width and 400 mm length. Calibration of the spring steel strip is effected by folding the strip over upon itself about its mid-point, somewhat in the form of a "C" with elongated limbs, and gradually applying an increasing load in the form of weights positioned on the uppermost limb adjacent the free end thereof until the free ends of the spring just make contact with each other. The required loading of the selected spring was 100 grammes, and the spring is therefore rated as a "100 gramme spring".

A strip of a multiple-layer film having a width of 25 mm and a length of about 150 mm, is folded over upon itself for testing so that portions of the surface layer formed from a composition of the present invention are in contact with each other, and the free ends of the film strip are secured by a suitable adhesive to the outermost surface of the free ends of the previously calibrated spring strip. The latter is maintained under manual compression so that the free ends of the spring strip remain in contact until the opposed surfaces of the film strip are sealed together between the heated jaws of a Sentinel Heat Sealer (Model No. 12AS), the free ends of the spring strip being positioned outside but immediately adjacent the edges of the sealing jaws. The depth "y" of the jaws, aligned parallel to the longitudinal axis of the film strip, is 25 mm, so that a square heat-seal of side 25 mm is formed between the opposed surfaces of the film strip.

Upon closure of the sealing jaws the manual compression force is removed from the steel strip so that immediately upon retraction of the sealing jaws to the open position after formation of the heat-seal, the free ends of the steel strip are allowed to spring apart thereby tending to rupture the newly created heat-seal. The depth "x" of the opening thereby induced in the seal, parallel to the length of the film strip, provides a measure of the strength of the seal, the degree of seal opening being expressed in the form $\times 100/y\%$. The test procedure is then repeated on other samples of film.

In contrast to the hot seal strength which is determined before the thermal energy employed to form the heat-seal has dissipated, the "cold" heat-seal strength of the film is determined after the seal has cooled to ambient temperature, and the full potential strength of the seal has developed.

To determine the "cold" heat-seal strength, two strips of a multiple-layer film having at least one surface layer formed from a composition of the present invention were placed with the composition surfaces in contact with each other, and the ends of the strips sealed together between the jaws of a Sentinel Heat Sealer, Model No. 12AS, only one jaw of the unit being heated. The strength of the seal was measured by cutting from the sealed-together strips of film, which had been allowed to cool to ambient temperature, a strip 25 mm wide and some 100 mm long, the heat-seal extending across the entire width of the strip and having an area of some $25 \times 25$ mm. The unsealed ends of the strip were then attached respectively to a dynamometer and a gripping surface, a load was applied to the gripping surface, and the minimum load required to separate the strips in the sealed area was recorded by the dynamometer, and expressed as a seal strength of $\times$ g/25 mm, where $\times$ was the load in grammes.

Figure 2:
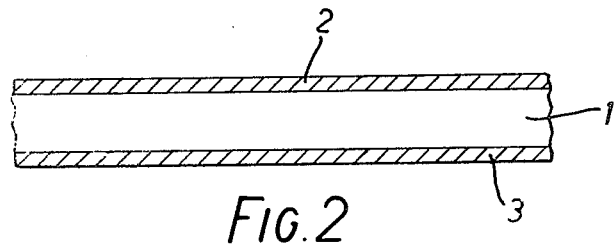

The invention is illustrated by reference to the accompanying drawings in which:

FIG. 1 depicts a side elevation of a portion of a propylene homopolymer base film 1 having a thin layer 2, formed from a blend of a propylene/butene-1 copolymer and a butene-1 polymer, on one surface thereof, and FIG. 2 depicts a side elevation of a similar substrate film 1 having a thin layer of the blend 2, 3 on each surface thereof.

The invention is further illustrated by reference to the following Examples.

EXAMPLE 1

This example illustrates the production of a propylene/butene-1 copolymer for use as a component of a composition for providing a heat-sealable layer on a multiple-layer film.

A stirred pressure vessel was charged with 280 gallons of dry hydrocarbon diluent (boiling point 150°–180° C.), and all traces of oxygen were removed by evacuation and purging with nitrogen. Then 23.7 mols of AlEt$_2$Cl (as a solution in 20 liters of diluent), and 13.2 mols of TiCl$_3$ (as a slurry in 20 liters of diluent) were added. This TiCl$_3$ was prepared by reducing TiCl$_4$ with ethyl aluminium sesquichloride as described in the Complete Specification of our British Pat. No. 1,014,944, with an aluminium diethyl chloride: titanium tetrachloride molar ratio of 0.9.

The autoclave was heated to 60° C. and 213 lb of propylene containing 0.16 mole % of hydrogen added over a period of 10 minutes. When the pressure had fallen to 32 psig (the pressure of inert gas in the reactor being 4.6 psig), 45 liters of butene were quickly introduced. Propylene, containing hydrogen, and butene were metered in together in a constant ratio so that a further 812 lb of propylene and 131 liters of liquid butene-1 were added over a period of 106 minutes. At this point the propylene feed rate was reduced to 74 lb/hour, and continued for a further hour, without any additional butene being charged, to allow the pressure to fall to 8.0 psig.

Catalyst residues were removed by injecting 55 liters of isopropanol and heating for 4 hours at 65° C. The resultant slurry, after washing with three successive 120 gallon lots of water, was filtered to remove most of the diluent. Steam distillation removed the remaining diluent to leave polymer particles which were filtered and dried in a rotary drier.

Approximately 1003 lb of a solid propylene/butene-1 copolymer was isolated from this reaction, the butene-1 content of the copolymer being 12% by weight.

The resultant dry, free-flowing powder had a Melt Flow Index, as hereinbefore defined, of approximately 32 g/10 minutes. The powder was then stabilized by the addition of 0.01% by weight, based on the weight of the copolymer, of 1,3,5-tri(3,5-ditertiarybutyl-4-hydroxybenzyl)2,4,6-trimethylbenzene, and 0.15% by weight of calcium stearate, and converted into granules of cylindrical shape by extrusion from an extruder with a barrel diameter of 83 mm maintained at a temperature of 250° C. The Melt Flow Index (MFI) of the resultant granules was approximately 65 g/10 minutes.

The degree of crystallinity of the copolymer, as hereinbefore defined, was approximately 50%, the crystalline content comprising approximately 52% of the alpha modification and 48% of the gamma modification.

Two film-forming compositions were prepared by dry, tumble blending quantities of the copolymer granules with sufficient of a commercially available butene-1 homopolymer (MFI approximately 50 g/10 minutes) to yield compositions containing respectively 25 and 50% of polybutene-1 by weight of the composition.

EXAMPLES 2 TO 8

These are comparative Examples.

From a triple channel annular die were coextruded a propylene homopolymer, and a propylene/butene-1 random copolymer containing 12% by weight of butene-1 and made according to Example 1, so as to form a polypropylene tube the internal and external surfaces of which were coated with a layer of the propylene/butene-1 copolymer. The propylene homopolymer contained, as anti-oxidant, 0.1% by weight of 1,3,5-tri(3,5-ditertiarybutyl-4-hydroxybenzyl)2,4,6-trimethylbenzene, and 33% by weight of recycled polymer (homopolymer plus propylene/butene-1 copolymer) reclaimed from a previously produced triple-layer film of the same composition.

The coated polypropylene tube was cooled by passage over a mandrel within the tube, and externally quenched by passage through a water bath surrounding the mandrel, heated to stretching temperature, expanded by internal gas pressure, and withdrawn from the expansion zone at a rate greater than that at which it was fed thereto, so that the tube was stretched to seven times its original dimensions in both the direction of extrusion and in a direction transverse thereto.

The stretched tubular film was then opened out to form flat film which was subsequently heat-set at a temperature of 125° C. on a matt-surfaced roller heat-setter of the kind described in British Pat. No. 1,124,886. The thickness of the copolymer layer on each surface of the resultant film was 0.11 micron, the substrate having a thickness of about 25 microns.

This procedure was repeated several times with appropriate adjustment of the rate of copolymer flow to produce a series of films in which the thickness of the copolymer layer on each surface of the substrate was respectively 0.19, 0.27, 0.36, 0.47, 0.54, and 0.59 micron.

X-ray examination of layers peeled from the film indicated that the crystalline structure of both the substrate and surface layers was substantially of the alpha or monoclinic modification.

A sample of each film was heat-sealed on a Sentinel Heat Sealer, Model No. 12AS, operating at a jaw temperature of 130° C., jaw pressure of 15 psi, and jaw closure time of 2 seconds. The hot seal strength of the resultant seals was determined, as hereinbefore described, using a steel strip spring rated at 100 grammes. The "cold" heat-seal strength (at ambient temperature) of the films was assessed by the dynamometer technique, as hereinbefore described, on four samples of each film sealed respectively at 90° C., 100° C., 110° C. and 120° C. on a Sentinel Heat Sealer, Model No. 12AS, operating at a jaw pressure of 15 psi and jaw closure time of 2 seconds.

The results are recorded in the accompanying Table.

TABLE

| Example No. | Surface layer thickness (μm) | Hot Seal strength % opening | Cold seal strength (g/25 mm) | | | |
|---|---|---|---|---|---|---|
| | | | (a) | (b) | (c) | (d) |
| 2 | 0.11 | 100 | 0 | 0 | 0 | 0 |
| 3 | 0.19 | 77 | 0 | 0 | 0 | 0 |
| 4 | 0.27 | 6 | 0 | 0 | 50 | 510 |
| 5 | 0.36 | 25 | 0 | 150 | 465 | 560 |
| 6 | 0.47 | 58 | 0 | 425 | 440 | 585 |
| 7 | 0.54 | 77 | 0 | 185 | 450 | 570 |
| 8 | 0.59 | 85 | 45 | 150 | 505 | 535 |

(a) seal formed at 90° C.
(b) seal formed at 100° C.
(c) seal formed at 110° C.
(d) seal formed at 120° C.

EXAMPLES 9 TO 15

The procedure of Examples 2 to 8 was repeated except that in each case the propylene/butene-1 copolymer was replaced by a blended composition comprising 75 parts by weight of the propylene/butene-1 copolymer and 25 parts by weight of polybutene-1.

Results of seal strength measurements are recorded in the accompanying Table.

TABLE

| Example No. | Surface layer thickness (μm) | Hot seal strength % opening | Cold seal strength (g/25 mm) | |
|---|---|---|---|---|
| | | | (c) | (d) |
| 9 | 0.11 | 100 | 0 | 0 |
| 10 | 0.19 | 27 | 5 | 70 |
| 11 | 0.27 | 8 | 485 | 510 |
| 12 | 0.36 | 58 | 515 | 560 |
| 13 | 0.47 | 50 | 490 | 595 |
| 14 | 0.54 | 65 | 485 | 575 |
| 15 | 0.59 | 71 | 500 | 590 |

(c) seal formed at 110° C.
(d) seal formed at 120° C.

The above results show that incorporation of polybutene-1 into the composition forming the surface layer of the film reduces the thickness of the surface layer required to yield a seal of measurable "cold" strength from about 0.27 μm (copolymer alone) to about 0.19 μm.

Similarly, the hot seal strength is improved (lower % opening) by the incorporation of polybutene-1.

EXAMPLES 16 TO 22

The procedure of Examples 2 to 8 was repeated except that in each case the propylene/butene-1 copolymer was replaced by a blended composition comprising 50 parts by weight of the propylene/butene-1 copolymer and 50 parts by weight of polybutene-1.

Results of seal strength measurements are recorded in the accompanying Table.

TABLE

| Example No. | Surface layer thickness (μm) | Hot Seal strength % opening | Cold seal strength (g/25 mm) | | | |
|---|---|---|---|---|---|---|
| | | | (a) | (b) | (c) | (d) |
| 16 | 0.11 | 23 | 0 | 15 | 180 | 565 |
| 17 | 0.19 | 6 | 0 | 75 | 265 | 505 |
| 18 | 0.27 | 35 | 45 | 115 | 330 | 550 |

TABLE-continued

| Example No. | Surface layer thickness (μm) | Hot Seal strength % opening | Cold seal strength (g/25 mm) | | | |
|---|---|---|---|---|---|---|
| | | | (a) | (b) | (c) | (d) |
| 19 | 0.36 | 40 | 80 | 150 | 340 | 560 |
| 20 | 0.47 | 31 | 90 | 180 | 370 | 585 |
| 21 | 0.54 | 17 | 130 | 340 | 475 | 545 |
| 22 | 0.59 | 23 | 160 | 275 | 535 | 580 |

(a) seal formed at 90° C.
(b) seal formed at 100° C.
(c) seal formed at 110° C.
(d) seal formed at 120° C.

The increase in polybutene-1 content from 25 to 50% by weight of the surface layer composition further extends the range of surface layer thickness at which seals of acceptable hot and cold strength are achieved.

The films also exhibit excellent optical characteristics, being clear and glossy.

EXAMPLES 23 TO 29

These are comparative Examples in which the procedure of Examples 2 to 8 was repeated using a butene-1 homopolymer in each case instead of the propylene/butene-1 copolymer.

Results of seal strength measurements are recorded in the accompanying Table.

TABLE

| Example No. | Surface layer thickness (μm) | Hot Seal strength % opening | Cold seal strength (g/25 mm) | | | |
|---|---|---|---|---|---|---|
| | | | (a) | (b) | (c) | (d) |
| 23 | 0.11 | 52 | 0 | 0 | 175 | 240 |
| 24 | 0.19 | 40 | 0 | 0 | 150 | 240 |
| 25 | 0.27 | 35 | 0 | 0 | 125 | 250 |
| 26 | 0.36 | 19 | 0 | 0 | 155 | 330 |
| 27 | 0.47 | 10 | 0 | 0 | 180 | 395 |
| 28 | 0.54 | 6 | 0 | 0 | 185 | 440 |
| 29 | 0.59 | 4 | 0 | 0 | 205 | 480 |

(a) seal formed at 90° C.
(b) seal formed at 100° C.
(c) seal formed at 110° C.
(d) seal formed at 120° C.

The cold seal strengths obtained are generally less than those obtained with the 50:50 blend of copolymer and butene-1 homopolymer (Examples 16 to 22), and the optical properties of the films are also inferior.

EXAMPLES 30 TO 32

These are comparative Examples, not according to the invention, and illustrate the influence of the content of reclaimed polymer in the substrate layer of the triple-layer film.

The procedure of Examples 2, 5 and 8 was repeated using as the substrate-forming polymer a material reclaimed by re-extrusion and granulation of a previously produced triple-layer film having a propylene homopolymer substrate and a propylene/butene-1 layer (88:12) layer on each surface thereof. This material was re-extruded from a triple channel die as the core layer between two layers of a propylene/butene-1 copolymer (88:12), and processed in identical manner to the compositions of Examples 2, 5 and 8. The core layer therefore consisted entirely of reclaimed material.

Results are recorded in the accompanying Table.

TABLE

| Example No. | Surface layer thickness (μm) | Hot seal strength % opening | Cold seal strength (g/25 mm) | |
|---|---|---|---|---|
| | | | (c) | (d) |
| 30 | 0.11 | 100 | 0 | 0 |
| 31 | 0.36 | 21 | 405 | 485 |
| 32 | 0.59 | 76 | 505 | 540 |

(c) seal formed at 110° C.
(d) seal formed at 120° C.

EXAMPLES 33 TO 35

The procedure of Examples 30 to 32 was repeated except that in each case, the surface layers formed on the reclaimed core layer were of a 50:50 blend by weight of the propylene/butene-1 copolymer (88:12) and polybutene-1.

Results are recorded in the accompanying Table.

TABLE

| Example No. | Surface layer thickness (μm) | Hot seal strength % opening | Cold seal strength (g/25 mm) | |
|---|---|---|---|---|
| | | | (c) | (d) |
| 33 | 0.11 | 15 | 235 | 555 |
| 34 | 0.36 | 25 | 610 | 600 |
| 35 | 0.59 | 14 | 620 | 635 |

(c) seal formed at 110° C.
(d) seal formed at 120° C.

Both hot and cold seal strengths show a considerable improvement over those of Examples 30 to 32, as a result of incorporating polybutene-1 into the surface layer of the triple-layer film. In addition the films exhibited excellent optical characteristics.

EXAMPLES 36 TO 39

These are comparative Examples, not according to the invention, and illustrate the effect of changing the composition of the surface layer associated with a substrate layer containing a substantial amount of reclaimed polymeric material.

The procedure of Examples 30 to 32 was repeated except that (a) the substrate material consisted of a blend containing 50 parts by weight of a propylene homopolymer and 50 parts by weight of a reclaimed triple-layer film having a propylene homopolymer substrate and a propylene/butene-1 (88:12) copolymer layer on each surface thereof, and (b) the coextruded layer on each surface of the blended substrate consisted of a blend containing 50 parts by weight of a propylene homopolymer and 50 parts by weight of a butene-1 copolymer containing approximately 10% by weight of ethylene.

The average cold seal strengths determined on samples of the coextruded film having different surface layer thicknesses and sealed at 120° C. are recorded in the accompanying Table.

TABLE

| Example No. | Surface layer thickness (μm) | Cold seal strength (g/25 mm) |
|---|---|---|
| 36 | 0.07 | 152 |
| 37 | 0.13 | 189 |
| 38 | 0.22 | 222 |
| 39 | 0.31 | 250 |

EXAMPLES 40 TO 43

The procedure of Examples 36 to 39 was repeated except that in each case the surface layers formed on the blended core layer were of a 50:50 blend by weight of a propylene/butene-1 copolymer (88:12) and of a butene-1/ethylene copolymer containing approximately 10% by weight of ethylene.

Results from samples of film sealed at 120° C. are recorded in the accompanying Table.

TABLE

| Example No. | Surface layer thickness (μm) | Cold seal strength (g/25 mm) |
| --- | --- | --- |
| 40 | 0.07 | 649 |
| 41 | 0.13 | 498 |
| 42 | 0.22 | 359 |
| 43 | 0.31 | 419 |

The improvement in cold seal strength obtained by replacing the propylene homopolymer component of the surface layer by a propylene/butene-1 copolymer is evident by comparison of these results with the values obtained in Examples 36 to 39.

We claim:

1. A multiple-layer film comprising a substrate layer of a homo- or co-polymer of an alpha-olefin the molecule of which contains from 2 to 6 carbon atoms, said substrate layer having a first and a second surface, and, on at least one of said surfaces of the substrate, a heat sealable layer formed from a composition comprising a blend of
   (a) a substantially crystalline copolymer of propylene with an alpha-olefin containing from 4 to 10 carbon atoms in its molecule, the propylene content of the copolymer being from 80 to 95% by weight of the copolymer, and
   (b) a second polymer comprising a homopolymer of an alpha-olefin containing from 4 to 10 carbon atoms in its molecule or a substantially crystalline copolymer in which said alpha-olefin is copolymerised with up to 10% by weight, based on the weight of the copolymer, of an alpha-olefin containing from 2 to 10 carbon atoms in its molecule, the second polymer constituting from 25 to 90% by weight of the composition.

2. A multiple-layer film according to claim 1 wherein the substrate layer comprises a homopolymer of propylene, or a copolymer thereof with up to 15% by weight of the copolymer of an alpha-olefin containing 2, 4, 5 or 6 carbon atoms in its molecule.

3. A multiple-layer film according to claim 1 wherein the crystalline content of the substrate layer, and of the, or each, surface layer is of the same crystalline form.

4. A multiple-layer film according to claim 1 wherein the thickness of the, or each, composition layer is from 0.2 to 50% of that of the substrate.

5. A biaxially oriented multiple-layer film comprising a substrate layer of a propylene homopolymer or a copolymer of propylene with from 0.5 to 10% of ethylene by weight of the copolymer, said substrate layer having a first and a second surface, and, on at least one of said surfaces of the substrate, a coextruded heat sealable layer formed from a blend comprising from 65 to 35% by weight of a propylene/butene-1 substantially crystalline random copolymer containing from 10 to 15% of butene-1 by weight of said random copolymer, and from 35 to 65% by weight of a substantially crystalline butene-1 homopolymer.

* * * * *